(12) United States Patent
Du et al.

(10) Patent No.: US 9,349,000 B2
(45) Date of Patent: May 24, 2016

(54) WEB SERVICE SANDBOX SYSTEM

(71) Applicant: Microsoft Corporation, Redmond, WA (US)

(72) Inventors: Bin Du, Beijing (CN); Tao Wu, Beijing (CN); Xiangyue Hua, Beijing (CN); Ruoying Liang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/165,321

(22) Filed: Jan. 27, 2014

(65) Prior Publication Data
US 2015/0213259 A1 Jul. 30, 2015

(51) Int. Cl.
*H04L 29/06* (2006.01)
*G06F 21/53* (2013.01)
*G06F 17/22* (2006.01)
*H04L 29/12* (2006.01)

(52) U.S. Cl.
CPC ............ *G06F 21/53* (2013.01); *G06F 17/2247* (2013.01); *H04L 61/1511* (2013.01); *H04L 61/2564* (2013.01); *H04L 63/145* (2013.01); *H04L 63/1408* (2013.01); *H04L 63/1441* (2013.01); *H04L 63/1466* (2013.01); *H04L 63/168* (2013.01)

(58) Field of Classification Search
None
See application file for complete search history.

(56) References Cited

U.S. PATENT DOCUMENTS

| 8,250,082 | B2 | 8/2012 | Gwozdz et al. | |
|---|---|---|---|---|
| 8,291,475 | B2 | 10/2012 | Jackson et al. | |
| 8,438,640 | B1 | 5/2013 | Vaish et al. | |
| 2007/0156871 | A1 | 7/2007 | Braun et al. | |
| 2009/0271690 | A1 | 10/2009 | Iglesias | |
| 2011/0016381 | A1 | 1/2011 | Cahill et al. | |
| 2011/0078108 | A1* | 3/2011 | Kumar ......................... | 707/602 |
| 2012/0317238 | A1 | 12/2012 | Beard | |
| 2013/0290404 | A1 | 10/2013 | Rajabi et al. | |

OTHER PUBLICATIONS

Agten et al., JSand: Complete Client-Side Sandboxing of Third-Party JavaScript without Browser Modifications, ACM, 2012.*
West, Play safely in sandboxed Iframes, Jan. 2013.*
MIC, "Sandbox Your Cross Domain JSONP to Improve Mashup Security", Published on: Jan. 27, 2009, Available at: http://beebole.com/blog/general/sandbox-your-cross-domain-jsonp-to-improve-mashup-security/.

(Continued)

*Primary Examiner* — Minh Dinh
(74) *Attorney, Agent, or Firm* — Steven Spellman; Tom Wong; Micky Minhas (57) ABSTRACT

A web service sandbox system. The web service sandbox system provides a secure mechanism with little to no risk to an origination domain hosting a user agent for the user agent to retrieve content from a potentially insecure web service hosted in another domain and using JSONP to bypass same-origin policy restrictions. The user agent posts a command message to a separate quarantined web session of a sandbox service acting as intermediary between the user agent web session and the web service. The sandbox service makes the actual call to and parses the response from the web service. Scripts from the response are executed only in the quarantined web session of the sandbox service. The resulting "safe" content obtained from the web service by the sandbox service is returned to the user agent where it may be rendered.

20 Claims, 8 Drawing Sheets

(56) References Cited

OTHER PUBLICATIONS

Delignat-Lavaud, et al., "Embedding of Security Components in Untrusted Third-Party Websites", In Proceedings of Research Report N8285, Apr. 2013, 35 pages.

International Preliminary Report on Patentability Issued in PCT Application No. PCT/US2015/012113, Mailed Date: Oct. 8, 2015, 7 Pages.

International Search Report and Written Opinion Issued in PCT Patent Application No. PCT/US2015/012113, Mailed Date: May 8, 2015, 10 Pages.

* cited by examiner

WEB SERVICE SANDBOX SYSTEM

BACKGROUND

There is often a need for a web application operating in a first domain to request information from a second domain. This is referred to as a cross-domain request. Due to security concerns, almost all client-side scripting languages (e.g., JavaScript®) have a same-origin policy. The XMLHttpRequest (XHR) application programming interface (API) available to various programming languages to make requests and receive responses also implements the same-origin policy. The same-origin policy prevents the originating domain from sending requests to a different domain and receiving a response. More specifically, the same-origin policy allows free access to the document object model (DOM) of a resource (e.g., a web page or web service) only if the target (i.e., destination) resource has the same host domain, protocol, and port number as the originating resource and prevents access to the DOM of a destination resource hosted in a different domain (i.e., having a different host, protocol, or port) than the originating resource.

A number of techniques to avoid the limitations imposed by the same-origin policy are available. Cross-origin resource sharing (CORS) is a draft standard that extends HTTP with new headers that allow a destination resource to explicitly specify the originating domains that can make requests to the server. While the proposed standard allows the use of a wildcard when specifying the originating domains to allow access from any domain, this introduces other limitations that may not be acceptable in some situations. For example, the use of the wildcard value "*" accepting any domain does not allow the request to supply credentials (i.e., secure socket layer (SSL) certificates) or cookies.

JavaScript Object Notation with Padding (JSONP) allows cross-domain requests without requiring the originating domain to be explicitly authorized by the destination resource. The JSONP response is typically JavaScript code that invokes a function call on JavaScript Object Notation (JSON) data. In other words, the JSONP response is a wrapper around the JSON data. This is accomplished by including a script element in the JSONP response that is dynamically injected into a hypertext markup language (HTML) document and loads the JSON data from the destination resource when executed in the originating domain. However, the use of JSONP puts the originating domain at risk. If the destination resource has any vulnerability that allows script code injection, the destination resource may be compromised (e.g., by malicious script code). When the script element in the response is executed, the originating domain is subject to attack from the malicious code.

It is with respect to these and other considerations that the present invention has been made. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of a web service sandbox system providing a user agent with a secure mechanism to retrieve content from a web service hosted in another domain that uses JSONP encoding to bypass same-origin policy restrictions and whose security cannot be assured with little to no risk to the origination domain hosting the user agent. The user agent includes an event handler (i.e., event listener), a message poster, a message listener, and a frame element, such as an inline frame element (e.g., an iFrame element). The event listener detects a user action that involves making a request to a supported web service. When the event listener determines that interaction with a supported web service has been initiated, the event listener invokes the message poster and passes the event arguments such as, but not limited to, the action, the search term, and the destination web service. The message poster posts a message with the appropriate arguments to the sandbox service. In various embodiments the message poster uses a PostMessage providing a controlled mechanism to securely circumvent the same-origination restriction and safely enable cross-origin/cross-document communication.

A sandbox service running on a sandbox device serves as an intermediary between the user agent and the web service. The sandbox service includes a message listener, a message poster, a requester, and a JSONP response parser. The sandbox service message listener receives and processes the message posted by the user agent and invokes the requester with the appropriate information from the received message. The requester then makes a web service call to the web service. The response parser processes the JSONP response from the web service. In various embodiments, the script elements are interpreted in a secure environment. The content of the response without the script elements is packaged or re-encoded by the response parser and the sandbox message poster is invoked. The content may be re-encoded as JSON data. The sandbox service may include a frame element, such as an inline frame element.

The web session associated with the user agent is separate from the web session associated with the sandbox service. In other words, scripts executed in the sandbox service web session do not have access to and cannot affect the user agent session. The sandbox service web session serves as buffer between the user agent and the web service. If the web service is compromised, malicious and/or harmful scripts may gain access to the sandbox service web session, but the user agent web session and the user's system remain secure because the sandbox service restricts passing script elements back to the user agent.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation or an implementation combining software and hardware aspects. The following detailed description is, therefore, not to be taken in a limiting sense.

Embodiments of a web service sandbox system are described herein and illustrated in the accompanying figures. The web service sandbox system provides a secure mechanism with little to no risk to an origination domain hosting a user agent for the user agent to retrieve content from a potentially insecure web service hosted in another domain and using JSONP to bypass same-origin policy restrictions. The user agent posts a command message to a separate web session of a sandbox service acting as intermediary between the user agent web session and the web service. The sandbox service makes the actual call to and parses the response from the web service. Scripts from the response are executed only in the quarantined web session of the sandbox service. The resulting "safe" content obtained from the web service by the sandbox service is returned to the user agent where it may be rendered.

Figure 1:
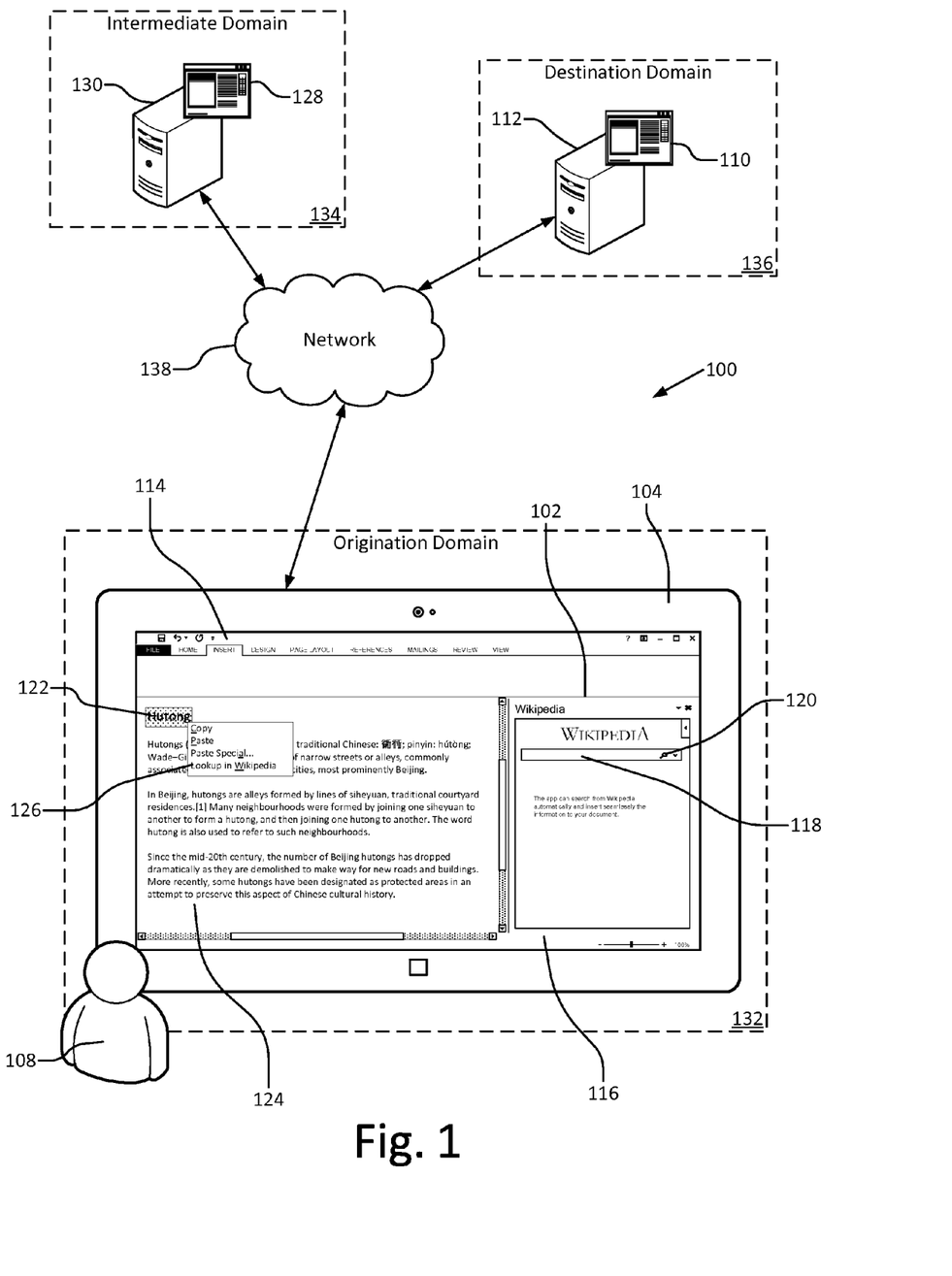
FIG. 1 illustrates one embodiment of a web service sandbox system implemented in a suitable computing environment.

FIG. 1 illustrates one embodiment of a web service sandbox system implemented in a suitable computing environment. The web service sandbox system 100 includes a user agent 102 executed on a client device 104. The user agent is a client application providing a user interface 106 that allows a user 108 to retrieve information from a web service 110 (i.e., the destination resource) running on a destination device 112. The user agent may be a stand-alone application. In some embodiments, the user agent may be a component of another application. For example, the user agent may be a service or add-in callable by a associated application 114. Examples of suitable associated applications include, but are not limited to, word processing, spreadsheet, database, slide presentation, electronic mail, drawing, web browser, media player, and game applications.

The illustrated embodiment shows one non-limiting example of the user agent operating as an add-in to an associated word processing application 116. In various embodiments, the user agent includes HTML pages and, optionally, scripts that provide the user interface. The exemplary user interface provides a search box 118 and a search button 120 in the user agent that may be used to initiate a user action ultimately executed against the web service. The user interface may vary depending upon factors such as, but not limited to, the user agent and the associated application. The user interface may also allow user actions against the web service to be initiated from the associated application. For example, the user interface may permit the user to highlight a term 122 in document 124 and select a search action from a menu 126 such as, but not limited to the associated application menu bar, a right click menu accessed using a mouse, or a radial menu accessed through a touch gesture (e.g., a long press).

The web service may be, and typically is, operated by a third-party. Web service transactions are through an interface described in a computer readable format such as the Web Service Definition Language (WSDL) that defines the access point(s), method(s), and other specifications of the web service or an application programming interface (API). One non-limiting example of a web service that may be accessed by the user agent is the Wikipedia® web service accessed through the MediaWiki® API. The web service interface accepts messages specifying input arguments (e.g., actions) and returns responses that may be used by the requesting client (e.g., content). The messages are written using data exchange formats such as, but not limited to, the Extensible Markup Language (XML), JavaScript Object Notation (JSON), and JavaScript Object Notation with Padding (JSONP). The messages are typically sent over the Internet using transport protocols such as, but not limited to, Hypertext Transfer Protocol (HTTP) and Hypertext Transfer Protocol Secure (HTTPS). The web service may be a Representational State Transfer (REST) compliant service with a uniform set of methods or an arbitrary service with an arbitrary set of methods.

A sandbox service 128 running on the client device 130 serves as an intermediary between the user agent and the web service. In various embodiments, the sandbox service runs in a frame element (e.g., an inline frame) of an HTML page from the user agent and includes HTML pages and scripts used to process requests received from the user agent and responses received from the web service. The user agent, the sandbox service, and the web service are hosted in different domains: the origination domain 132, the intermediate domain 134, and the destination domain 136, respectively. The intermediate domain and, therefore, any potentially harmful scripts being processed by the sandbox service do not have access to the data and resources of the origination domain, such as, sign-in tokens, cache, and personal information. An initial request for information from a supported web service made by the user agent is sent to the sandbox service using a cross-domain call. One example of a suitable cross-domain call is a PostMessage function. The sandbox service makes a call to the web service based on the initial request and receives the response from the web service. The sandbox service then processes the response and generates a new message containing the substantive content that is sent to the user agent. The message returned to the user agent by the sandbox is free from any potentially malicious elements.

The client device and the destination device communicate through the sandbox service over at least one computer network 138, such as, but not limited to, the Internet, an intranet, a local area network, or a wide area network. The client device and the destination device are all computing devices. Examples of suitable computing devices for implementing the client device include, but are not limited to, desktop computers, laptops, tablet or surface computers, smart phones, and smart appliances. The user agent and the sandbox service may be executed on the same computing device in different process spaces.

Figure 2:
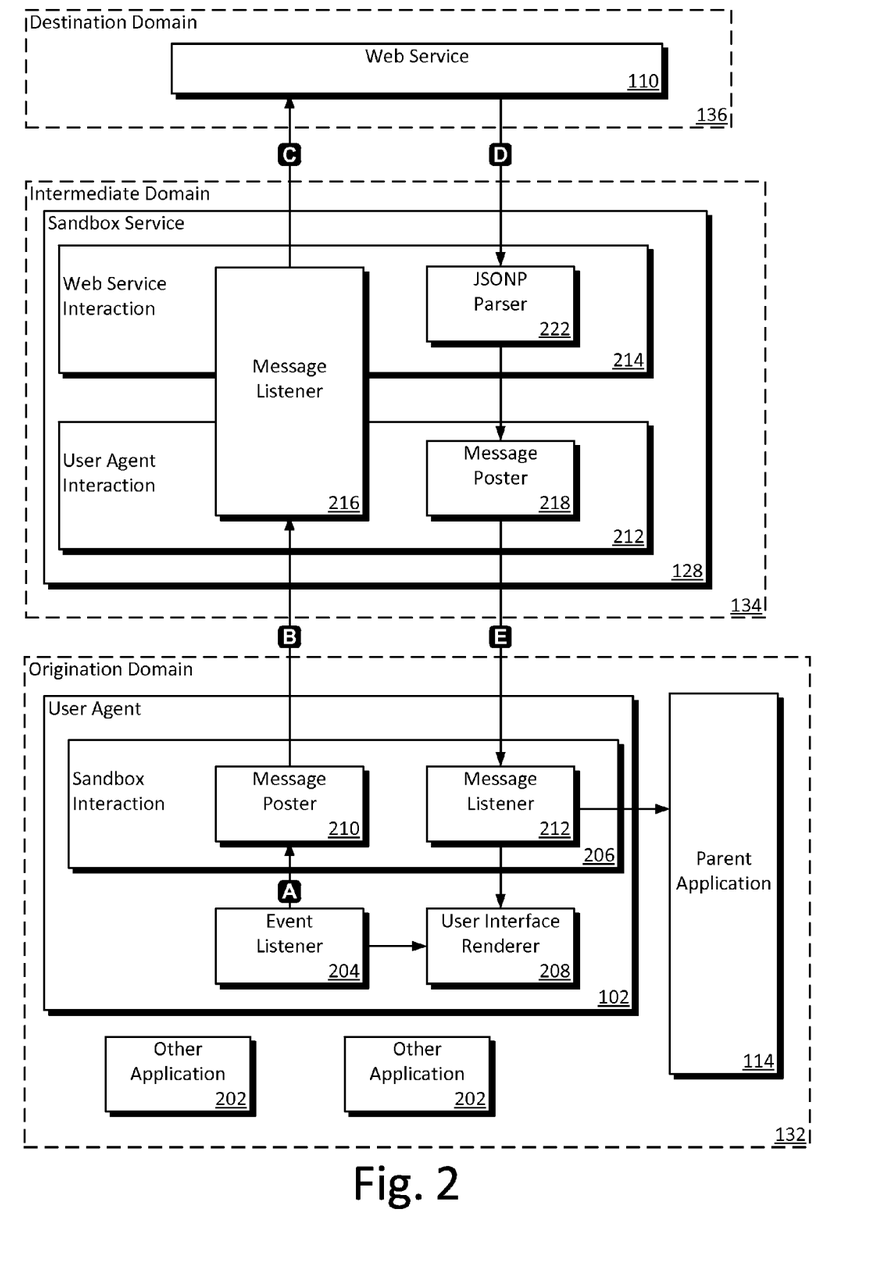
FIG. 2 is a flow diagram of one embodiment of the web service sandbox system illustrating the interactions between the user agent, the sandbox service, and the web service.

FIG. 2 is a flow diagram of one embodiment of the web service sandbox system illustrating the interactions between the user agent 102, the sandbox service 128, and the web service. The origination domain 132 of the web service sandbox system may be the local domain of the client device or a publicly hosted domain (e.g., oaspapps.com). In various embodiments, the origination domain hosts at least the user agent and may also host one or more additional applications such as the associated application and other various applications 202. In various embodiments, the origination domain corresponds to the application layer of an open systems interconnection (OSI) server. The user agent may take advantage of software libraries, frameworks, and APIs such as, but not limited to, the .NET framework and the XMLHttpRequest API for communication functionality.

The user agent includes an event handler 204 (i.e., event listener), a sandbox interaction component 206 that handles communications with the sandbox service 128, and a user interface renderer 208. The sandbox interaction component includes a message poster 210 and a message listener 212. The event listener detects user actions that involve making requests to a supported web service. The user interface renderer is responsible for displaying the user interface that allows the user to make the request to the supported web service and to display the response from the web service. The manner in which the user action is invoked may vary based upon the user agent, the associated application, and the type of user interface. For example, the user may enter a search term into a search box and initiate a search by activating a search button. Alternatively, the user may highlight a term in document and select a search option through a right click action or a touch gesture. The message listener may optionally share information with the associated application allowing the response to be consumed and used by the associated application. For example, the associated application may paste content received from the web service directly into the document created with the associated application.

When interaction with a supported web service 110 has been initiated, the event listener invokes the message poster and provides the event arguments such as, but not limited to, the action, the search term, and the destination web service as represented by data flow arrow A. The message poster posts a message with the appropriate arguments to the sandbox service as represented by data flow arrow B. The message may be in a format that may be understandable by the web service or the message may be in an intermediate format that will be understood by the sandbox service and translated into an appropriate request format for use with the web service. For example, the message may be a parameterized uniform resource locator (URL) for retrieving data from a web service or the message may be one or more parameters such as a command (e.g., "callService") and corresponding arguments (e.g., service name, service address, or search terms). In various embodiments the message poster uses a PostMessage function provided by Java, JavaScript, or a web API. The PostMessage method provides a controlled mechanism to securely circumvent the same-origination restriction and safely enable cross-origin/cross-document communication.

The sandbox service includes a user agent interaction component 212 and a web service interaction component 214. The user agent interaction component cooperates with the sandbox interaction component to provide two-way communication between the user agent 102 and the sandbox service 128. The user agent interaction component includes a message listener 216 and a message poster 218. The web service interaction component cooperates with the sandbox interaction component to provide two-way communication between the sandbox service and the web service. The web service interaction component includes the message listener 216 and a response parser 222. In various embodiments, the response parser is a JSONP parser and interpreter.

The sandbox service message listener 216 receives and processes the message posted by the user agent and makes a web service call to the web service with the appropriate information from the received message as represented by data flow arrow C. For example, the sandbox service message listener may generate a parameterized uniform resource locator (URL) for retrieving data from a web service. The response parser receives the response from the web service as represented by data flow arrow D. The response parser parses out data elements and interprets any script elements. In various embodiments, the script elements are interpreted in a secure environment such as a quarantined web session (i.e., a sandbox). Once the content has been obtained from the web service and all script elements have been executed in the sandbox, the content without any script elements is packaged or re-encoded by the response parser and the sandbox message poster is invoked. The content may be re-encoded as JSON data. The message poster redirects the message to the user agent as represented by data flow arrow E. In various embodiments the sandbox message poster uses a PostMessage function to return serialized JSON data containing the data (i.e., content) retrieved from the web service. The user agent message listener may optionally parse the message (e.g., the serialized JSON data) without evaluating or interpreting it and only allow non-script elements to be rendered providing an additional layer of defense. Because access to the sandbox service is limited and the response is processed by the sandbox service before being made available to the user agent, the risk of malicious content that could threaten the integrity of the origination domain 132 is minimal to non-existent.

The web session associated with the user agent is separate from the web session associated with the sandbox service. In other words, scripts executed in the sandbox service web session do not have access to and cannot affect the user agent session. The sandbox service web session serves as buffer between the user agent and the web service. In the event that the web service has been compromised, malicious and/or harmful scripts may gain access to the sandbox service web session, but the user agent web session and the user's system remain secure because the sandbox service restricts passing script elements back to the user agent.

Figure 3:
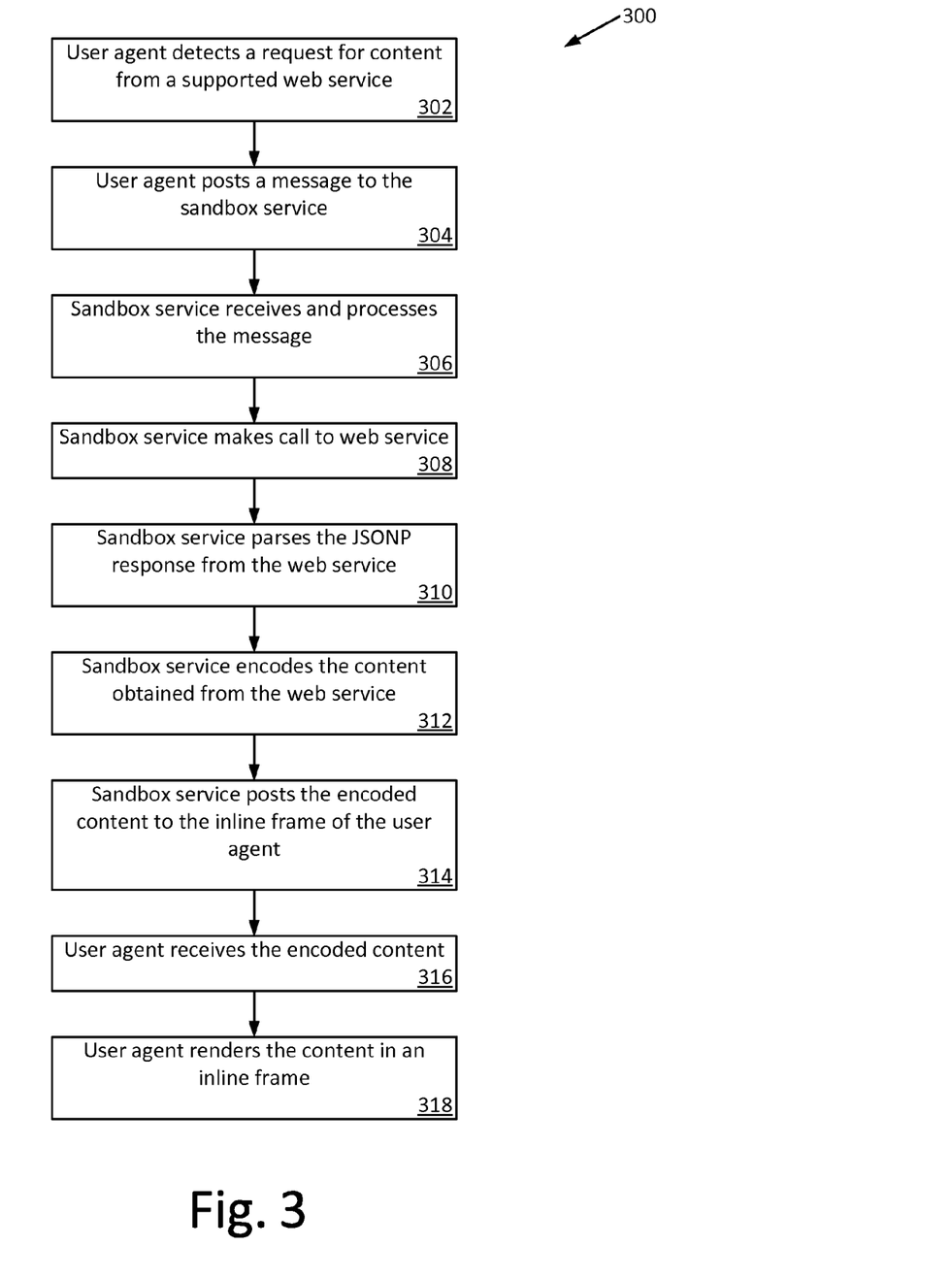
FIG. 3 is a high level flowchart of one embodiment of the sandboxing method performed by the web service sandbox system.

FIG. 3 is a high level flowchart of one embodiment of the sandboxing method performed by the web service sandbox system. The sandboxing method 300 begins with an event detection operation 302. For example, the event detection user may respond to a user performing a keyword search in the user agent. A sandbox posting operation 304 posts a message to the sandbox service containing a command instructing the sandbox service to request data from a web service.

A message receipt operation 306 receives the message at the sandbox service endpoint (i.e., the sandbox service message listener) and processes the message. In various embodiments, the sandbox service message listener filters messages based on a whitelist of approved domains. The message or the relevant information (e.g., parameters such as the keyword being searched) from the message is passed on to the requester. A web service request operation 308 makes the actual request to the web service. This may involve addressing the message posted by the user agent to the web service endpoint, reformatting the message to be acceptable by the web service, or generating a new request based on the message posted by the user agent. Because the sandbox service is hosted in different domain than the web service, the same-origin policy restriction constrains the interaction between the sandbox and the web service. In various embodiments, the web service provides a JSONP response allowing cross-domain communication on its own initiative or because the request specifies JSONP for the response.

A response parsing operation 310 parses and interprets the response from the web service. In various embodiments, the web service responds with a JSONP response. The script elements may be dynamically inserted into the document being compiled by the sandbox service and executed against JSON data at the web service in order to bypass the same-origin policy restriction. Because of the potential security risks associated with the use JSONP, a threat mitigation operation 312 works to eliminate those potential security risks. Ultimately, the threat mitigation operation obtains the content (e.g., the JSON encoded data) from the web service by interpreting and executing the script elements of the JSONP response. The "safe" content (i.e., non-script content) is then re-encoded without any script elements for transfer to the user agent. For example, the non-script HTML elements may be re-encoded as a serialized JSON payload that is returned using the PostMessage function and rendered by the user agent. The ultimate output of the response parsing operation is the content received from the web service in non-script HTML elements that pose no risk of malicious code execution when rendered by the user agent.

In a response posting operation 314, the response parser posts a message from the frame element (e.g., the inline frame) containing the sandbox service containing the encoded data to the parent HTML page (i.e., the user agent). A response receipt operation 316 receives the message from the sandbox service at the user agent message listener and processes the response message as necessary. For example, the user agent endpoint may execute the parse the encoded data to extract the content without interpreting or executing the encoded data. In various embodiments, the sandbox service message listener filters messages based on a whitelist of approved domains. A rendering operation 318 presents the content in the user agent for viewing by the user.

Unlike a persistent and publicly available web service that may be infected with malicious code, access to the sandbox service is limited. Further, if the sandbox service uses virtual machines, any malicious code is discarded when the virtual machine is uninstantiated. The more frequently that the virtual machines are refreshed, the risk of potential threats decreases. Further, the content provided by the sandbox server contains few, if any, script elements.

Figure 4:
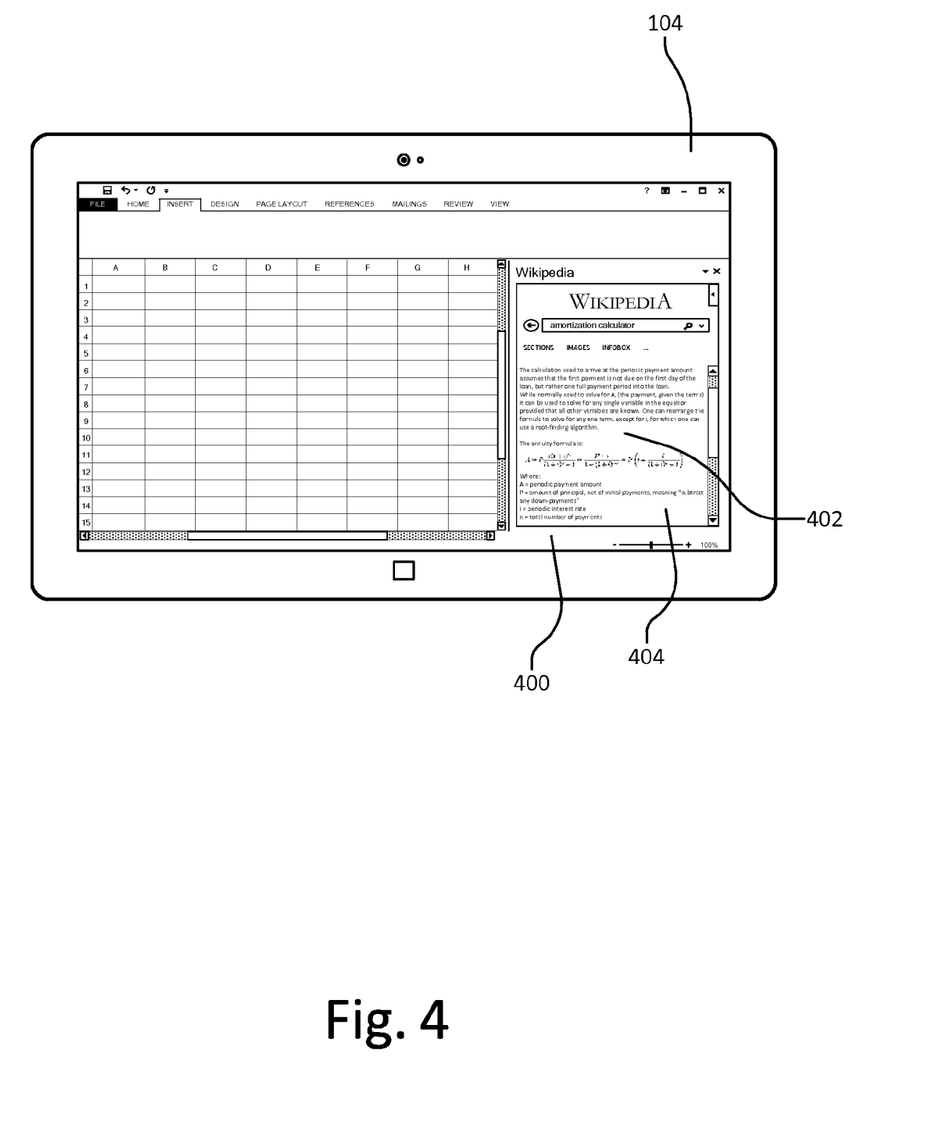
FIG. 4 shows the content of the response from the web service being displayed in the user agent.

FIG. 4 shows the content of the response from the web service being displayed in the user agent. In the illustrated embodiment, the associated application is a spreadsheet application 400. The content 402 is displayed the frame element 404.

The subject matter of this application may be practiced in a variety of embodiments as systems, devices, and other articles of manufacture or as methods. Embodiments may be implemented as hardware, software, computer readable media, or a combination thereof. The embodiments and functionalities described herein may operate via a multitude of computing systems including, without limitation, desktop computer systems, wired and wireless computing systems, mobile computing systems 104 (e.g., mobile telephones, netbooks, tablet or slate type computers, notebook computers, and laptop computers), hand-held devices, multiprocessor systems, microprocessor-based or programmable consumer electronics, minicomputers, and mainframe computers.

User interfaces and information of various types may be displayed via on-board computing device displays or via remote display units associated with one or more computing devices 104. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
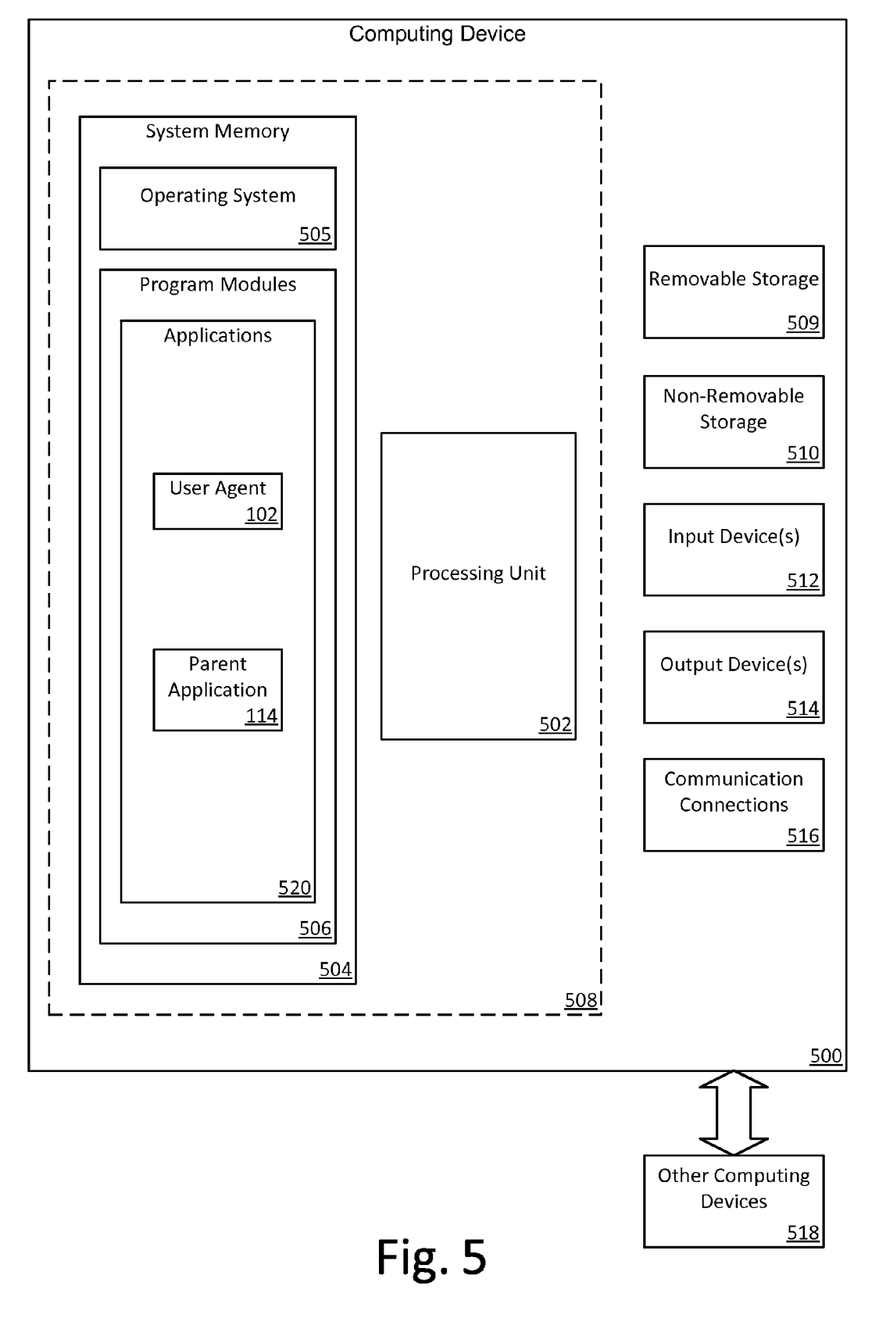
FIG. 5 is a block diagram illustrating one embodiment of the physical components of a computing device with which embodiments of the invention may be practiced.
Figure 6A:
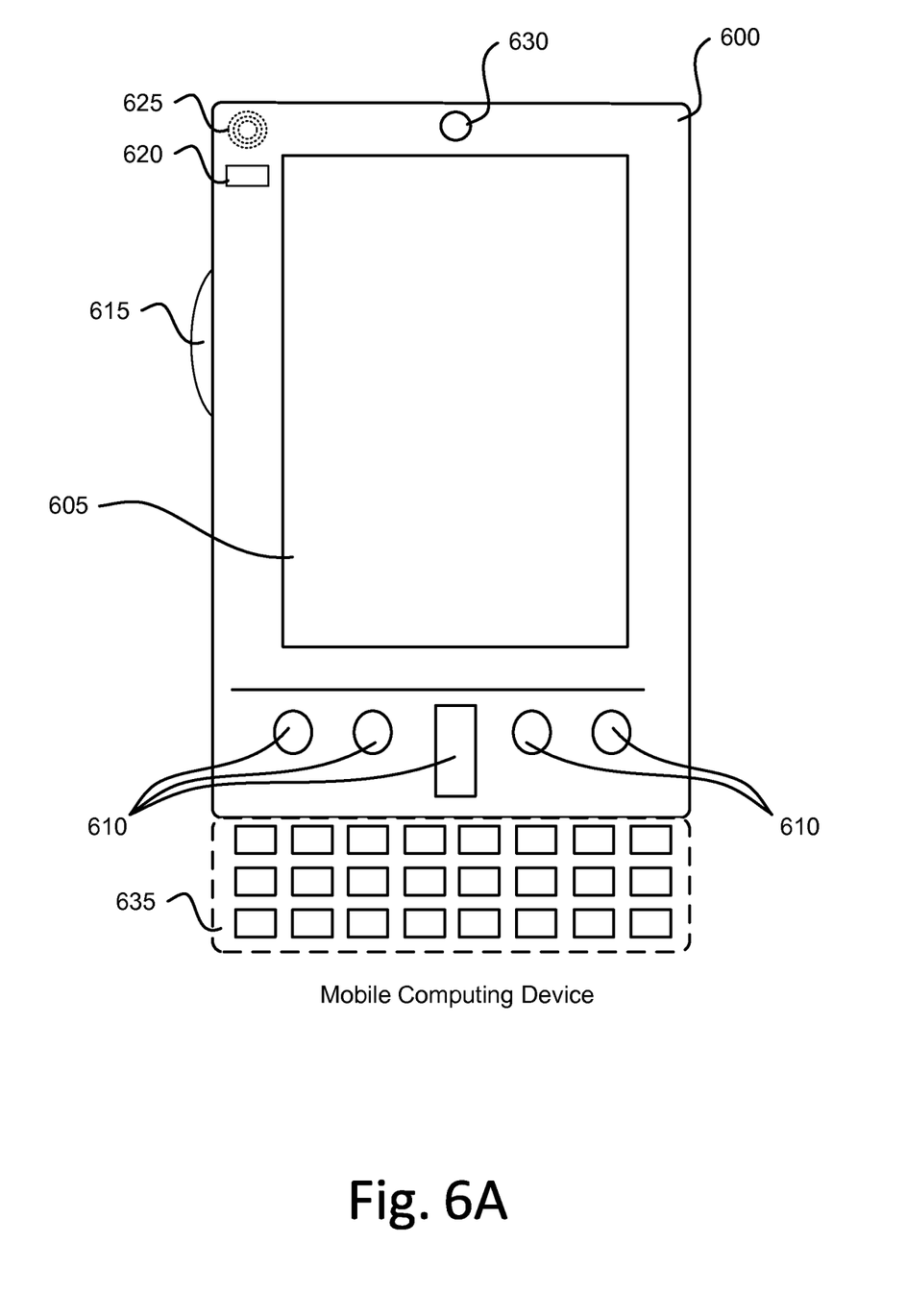
FIGS. 6A and 6B are simplified block diagrams of a mobile computing device with which embodiments of the present invention may be practiced.
Figure 6B:
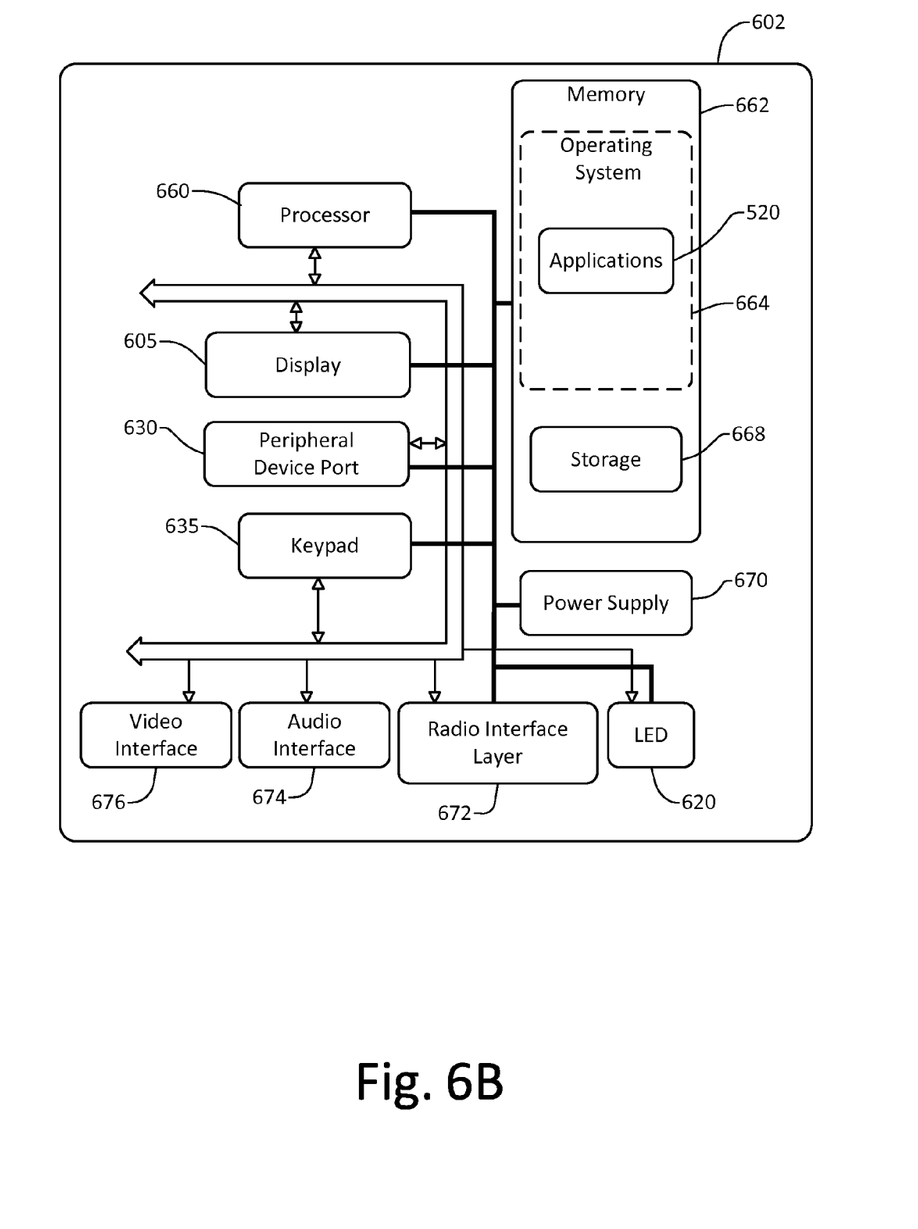

FIGS. 5 and 6 and the associated descriptions provide a discussion of a variety of operating environments in which embodiments of the invention may be practiced. However, the devices and systems illustrated and discussed are for purposes of example and illustration and are not limiting of a vast number of computing device configurations that may be utilized for practicing embodiments of the invention described above.

FIG. 5 is a block diagram illustrating physical components (i.e., hardware) of a computing device 500 with which embodiments of the invention may be practiced. The computing device components described below may be suitable for embodying computing devices including, but not limited to, a personal computer, a tablet computer, a surface computer, and a smart phone, or any other computing device discussed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 520 such as the user agent 102 and the associated application 114. For example, the operating system 505 may be suitable for controlling the operation of the computing device 500. Furthermore, embodiments of the invention may be practiced in conjunction with a graphics library, other operating systems, or any other application program and is not limited to any particular application or system. This basic configuration is illustrated by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated by a removable storage device 509 and a non-removable storage device 510.

As stated above, a number of program modules and data files may be stored in the system memory 504. While executing on the processing unit 502, the software applications 520 may perform processes including, but not limited to, one or more of the stages of the sandboxing method 300. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the illustrated components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein with respect to the software applications 520 may be operated via application-specific logic integrated with other components of the computing device 500 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all examples of computer storage media (i.e., memory storage.) Computer storage media may include random access memory (RAM), read only memory (ROM), electrically erasable read-only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500.

FIGS. 6A and 6B illustrate a mobile computing device 600 with which embodiments of the invention may be practiced. Examples of suitable mobile computing devices include, but are not limited to, a mobile telephone, a smart phone, a tablet computer, a surface computer, and a laptop computer. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative embodiments, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface, a visual indicator 620 (e.g., a light emitting diode), and/or an audio transducer 625 (e.g., a speaker). In some embodiments, the mobile computing device 600 incorporates a vibration transducer for providing the user with tactile feedback. In yet another embodiment, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one embodiment of a mobile computing device. That is, the mobile computing device 600 can incorporate a system (i.e., an architecture) 602 to implement some embodiments. In one embodiment, the system 602 is implemented as a smart phone capable of running one or more applications (e.g., browsers, e-mail clients, notes, contact managers, messaging clients, games, and media clients/players). In some embodiments, the system 602 is integrated as a computing device, such as an integrated personal digital assistant (PDA) and wireless phone.

One or more application programs 665 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 665 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including software applications 520 described herein.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the outside world via a communications carrier or service provider. Transmissions to and from the radio 672 are conducted under control of the operating system 664. In other words, communications received by the radio 672 may be disseminated to the application programs 665 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present invention, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
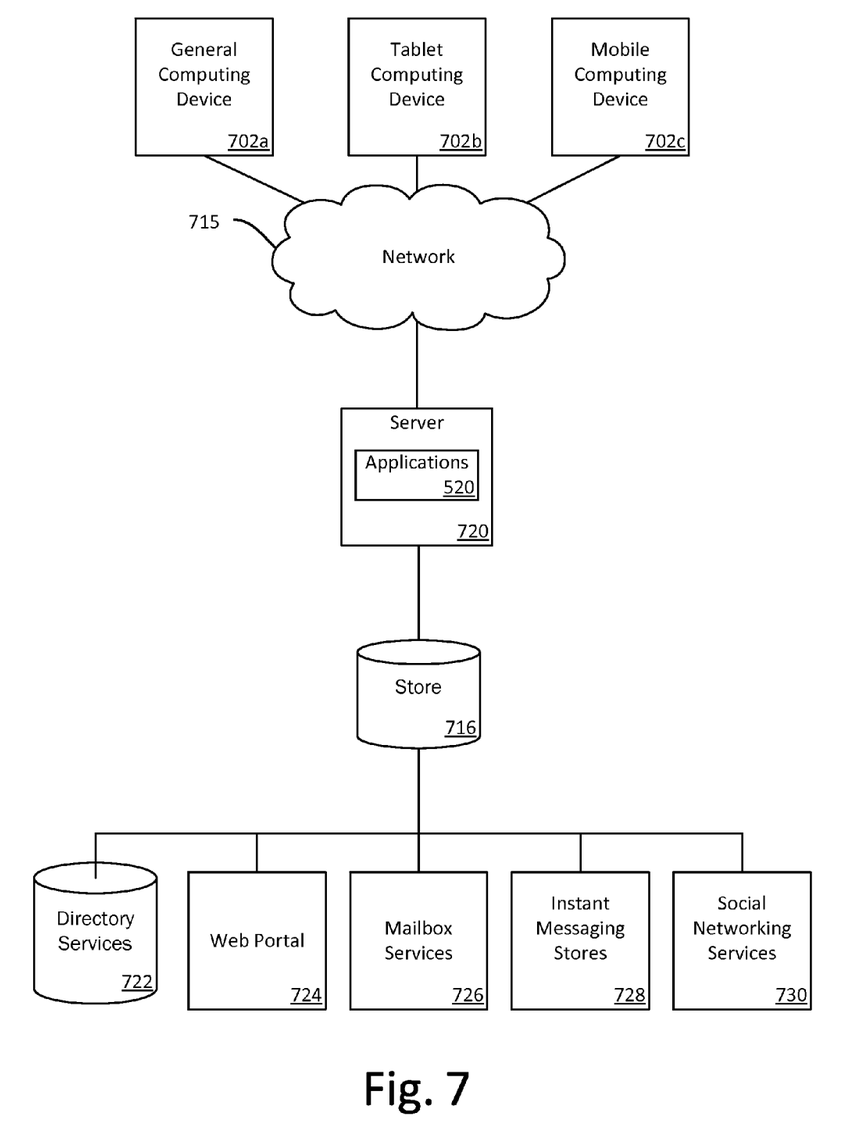
FIG. 7 is a simplified block diagram of a distributed computing system in which embodiments of the present invention may be practiced.

FIG. 7 illustrates one embodiment of the architecture of a system for providing web service sandbox system functionality to one or more client devices, as described above. Content developed, interacted with, or edited in association with the software applications 520 may be stored in different communication channels or other storage types. For example, various documents may be stored using a directory service 722, a web portal 724, a mailbox service 726, an instant messaging store 728, or a social networking site 730. The software applications 520 may use any of these types of systems or the like for enabling data utilization, as described herein. A server 720 may provide the software applications 520 to clients. As one example, the server 720 may be a web server providing the software applications 520 over the web. The server 720 may provide the software applications 520 over the web to clients through a network 715. By way of example, the client computing device may be implemented as the computing device 500 and embodied in a personal computer 702a, a tablet computer 702b, and/or a mobile computing device (e.g., a smart phone) 702c. Any of these embodiments of the client device 102 may obtain content from the store 716.

The description and illustration of one or more embodiments provided in this application are intended to provide a complete thorough and complete disclosure the full scope of the subject matter to those skilled in the art and not intended to limit or restrict the scope of the invention as claimed in any way. The embodiments, examples, and details provided in this application are considered sufficient to convey possession and enable those skilled in the art to practice the best mode of claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method of removing a potentially harmful script element from a web service response to protect a user's system, the method comprising the acts of:

detecting a user action corresponding to a request to obtain information from the web service by a user agent;

sending a command corresponding to the user action from a parent HTML page in the user agent hosted in a first domain to a sandbox service operating in an inline frame of the parent HTML page, the sandbox service hosted in a second domain;

making a call from the sandbox service to a web service in a third domain based on the command;

receiving a response from the web service containing a script element at the sandbox service;

parsing the response by the sandbox service to obtain web service data without script elements;

sending the web service data without script elements to the user agent; and rendering the web service data without script elements and without interpreting or executing the web service data received from the sandbox service in the user agent and wherein the web service data without script elements maintains having been from the sandbox service hosted in the second domain.

2. The method of claim 1 wherein the act of sending a command corresponding to the user action from a parent HTML page in the user agent hosted in a first domain to a sandbox service operating in an inline frame of the parent HTML page further comprises the act of posting a cross-document message containing the command to the sandbox service.

3. The method of claim 1 wherein the act of parsing the response by the sandbox service to obtain web service data without script elements further comprises the act of executing the script elements in a first web session associated with the sandbox service that is separate from a second web session associated with the user agent.

4. The method of claim 1 wherein the act of sending the web service data without script elements to the user agent further comprises the acts of:

encoding non-script elements obtained from the web service as serialized JSON data by the sandbox service; and posting a cross-document message containing the serialized JSON data from the sandbox service to the user agent.

5. The method of claim 1 wherein the response from the web service is a JSONP response.

6. The method of claim 1 further comprising the act of filtering the commands received at the sandbox server based on a whitelist of approved origination domains.

7. A system removing a potentially harmful element from a web service response, the system comprising:
   a first computing device having a processor, a memory, a network connection, and a display screen;
   a user agent running on the first computing device and hosted in a first domain, the user agent comprising a parent HTML page; and
   a sandbox service hosted in a second domain and running in an inline frame of the parent HTML page, the sandbox service operable to receive a message from the user agent indicating content to be requested from a web service hosted in third domain, make a request for the content to the web service on behalf of the user agent, produce a sandbox output from the web service response with the potentially harmful element removed, and send the sandbox output to the user agent, wherein the first domain, the second domain, and third domain are different from each other;
   wherein the user agent renders the sandbox output without interpreting or executing the sandbox output and wherein sandbox output maintains having been from the sandbox service hosted in the second domain while being rendered.

8. The system of claim 7 wherein the web service response is a JSONP message.

9. The system of claim 8 wherein the potentially harmful element is a script element.

10. The system of claim 7:
    wherein the user agent comprises:
    an event listener operable to detect a user action requesting information from a web service; and
    a user agent message poster associated with the parent HTML page, the user agent message poster operable to redirect a first message corresponding to the user action posted by the event listener to the sandbox service; and
    wherein the sandbox service comprises:
    a sandbox message listener associated with the sandbox service, the sandbox message listener operable to receive the first message;
    a web service requester associated with the sandbox service, the web service requester operable to send a request corresponding to the first message to the web service;
    a response parser associated with the sandbox service, the response parser operable to receive and parse a response from the web service and to produce the sandbox output with potentially harmful elements removed; and
    a sandbox message poster operable to send a second message corresponding to the response parser output to the user agent.

11. The system of claim 10 wherein the user agent further comprises a user agent message listener associated with the parent HTML page, the user agent message listener operable to receive and render the content of the second message.

12. The system of claim 10 wherein the user agent further comprises a user interface renderer associated with the user agent, the user interface renderer operable to display the content of the parent HTML page on the display screen of the first computing device.

13. The system of claim 10 wherein the response from the web service is a JSONP message and the response parser is a JSON parser.

14. The system of claim 10 wherein the first message and the second message are communicated using cross-domain communication functions.

15. The system of claim 14 wherein the cross-domain communication functions are PostMessage functions.

16. A computer readable storage device medium containing computer executable instructions which, when executed by a computer, perform a method of protecting a system requesting information from a web service from potentially harmful content, the method comprising the acts of:
    hosting a user agent in a first domain;
    providing an inline frame in the user agent;
    running a sandbox service in the inline frame and hosting the sandbox service in a second domain;
    sending a request message from the user agent to the sandbox service;
    making a call to a web service in a third domain based on the message;
    receiving a JSONP response to the call that is capable of carrying potentially harmful content at the sandbox service;
    processing the JSONP response by the sandbox service to remove the potentially harmful content and obtain harmless content;
    sending the harmless content to the user agent;
    rendering the harmless content without interpreting or executing the harmless content and wherein the harmless content maintains having been from the sandbox service hosted in the second domain.

17. The computer readable storage device of claim 16 wherein the act of sending a request from the user agent to the sandbox service further comprises the act of posting the message from the user agent to the sandbox service using a cross-domain communication function.

18. The computer readable storage device of claim 17 further comprising the act of rendering the harmless content in the user agent.

19. The computer readable storage device of claim 16 wherein the act of processing the JSONP response by the sandbox service to remove the potentially harmful content and obtain harmless content further comprises the acts of:
    executing script elements in the JSONP response; and
    collecting only non-script HTML elements as harmless content.

20. The computer readable storage device of claim 16 wherein the act sending the harmless content to the user agent further comprises the act of posting a response message associated with the harmless content from the sandbox service to the user agent using a cross-domain communication function.

* * * * *